US012656060B2

(12) United States Patent
Lang et al.

(10) Patent No.: US 12,656,060 B2
(45) Date of Patent: Jun. 16, 2026

(54) VACUUM DRYING DEVICE AND USING METHOD THEREOF

(71) Applicant: ZHEJIANG UNIVERSITY OF SCIENCE & TECHNOLOGY, Hangzhou (CN)

(72) Inventors: Tingting Lang, Hangzhou (CN); Fanghao Li, Hangzhou (CN); Xinrong Jin, Hangzhou (CN); Junhao Ye, Hangzhou (CN)

(73) Assignee: ZHEJIANG UNIVERSITY OF SCIENCE & TECHNOLOGY, Hangzhou (CN)

( * ) Notice: Subject to any disclaimer, the term of this patent is extended or adjusted under 35 U.S.C. 154(b) by 627 days.

(21) Appl. No.: 18/205,592

(22) Filed: Jun. 5, 2023

(65) Prior Publication Data

US 2024/0377133 A1 Nov. 14, 2024

(30) Foreign Application Priority Data

May 8, 2023 (CN) ......................... 202310510198.7

(51) Int. Cl.

| | |
|---|---|
| ***F26B 5/12*** | (2006.01) |
| ***F26B 3/00*** | (2006.01) |
| ***F26B 5/04*** | (2006.01) |
| ***F26B 11/12*** | (2006.01) |
| ***F26B 23/04*** | (2006.01) |

(52) U.S. Cl.
CPC .................. *F26B 5/12* (2013.01); *F26B 3/00* (2013.01); *F26B 11/12* (2013.01); *F26B 2200/00* (2013.01)

(58) Field of Classification Search
CPC ...... F26B 5/04; F26B 5/12; F26B 3/00; F26B 11/12; H01L 2224/751; H01L 2224/75102; H01L 2224/781
USPC ..................................... 34/266, 267, 639, 92
See application file for complete search history.

(56) References Cited

U.S. PATENT DOCUMENTS 7,254,902 B2 * 8/2007 Hayasaka ............ B41F 23/044 34/620
2012/0091187 A1 * 4/2012 Akiyama .......... H01L 21/67092 228/221

* cited by examiner

*Primary Examiner* — Deming Wan
(74) *Attorney, Agent, or Firm* — Leong C. Lei

(57) ABSTRACT

A vacuum drying device and a related method thereof are provided. The device includes a box body, where a bottom end of the box body is provided with a base, and a top end of the box body is communicated with a vacuumizing pipeline. A lifting mechanism is arranged in the base, and a top end of the lifting mechanism is fixedly connected with a table top. A plurality of drying mechanisms are arranged on the table top, and top ends of the drying mechanisms are fixedly connected with a take-up mechanism. The take-up mechanism is connected with a powder collecting mechanism, the take-up mechanism is fixedly connected with the box body, and the take-up mechanism is connected to a wire collecting mechanism. The wire collecting mechanism is connected to a powder collecting mechanism, and the wire collecting mechanism is fixedly connected to the vacuumizing pipeline.

8 Claims, 7 Drawing Sheets

VACUUM DRYING DEVICE AND USING METHOD THEREOF

CROSS-REFERENCE TO RELATED APPLICATIONS

This disclosure claims priority to Chinese Patent Application No. 202310510198.7, filed on May 8, 2023, the contents of which are hereby incorporated by reference.

TECHNICAL FIELD

The disclosure belongs to the technical field of vacuum drying, in particular to a vacuum drying device and a using method thereof.

BACKGROUND

Vacuum drying is to heat and dry dried materials under a vacuum condition, and use a vacuum pump to extract air and moisture, so that a vacuum state in a studio may be formed, a boiling point of water is reduced, a drying speed is accelerated, a high drying efficiency is obtained at a lower temperature, heat is fully used, and no impurities are mixed in a drying process.

In a process of vacuum drying, many materials are usually dried at the same time. Even if the materials are evenly stirred and have a same quality, there may be be differences in water contents. Therefore, in a drying process, a drying uniformity of each of the materials may be different. If drying degrees of the materials are not controlled, some materials may be dried or even burnt, while others may still retain moisture, so a drying efficiency and quality may be affected. Some vacuum drying devices detect the moisture of each material in real time through detection equipment, and then controls movements of the materials through controllers, and adjusts distances between the materials, a heater and a vacuumizing pipeline, so as to control moisture uniformity of each material. Not only is an equipment structure complicated, but a service life and stability of a control system and a detection system in the vacuum drying device are relatively low. In addition, due to an involvement of control and precision structures, a cost of the equipment may also increase significantly. Moreover, when the dried materials are powders, it is generally difficult for the existing equipment to automatically collect the powders pumped out by the vacuumizing pipeline. When a collection device is directly installed in the vacuumizing pipeline, the moisture is easy to accumulate at the collection device because of a high water content in an early stage. If the moisture accumulates too much, it may not only affect the collection device, but also affect the drying of subsequent materials.

SUMMARY

In order to solve above technical problems, the disclosure provides a vacuum drying device and a using method thereof.

In order to achieve an above objective, the disclosure provides the vacuum drying device, including a box body, where a bottom end of the box body is provided with a base, and a top end of the box body is communicated with a vacuumizing pipeline. A lifting mechanism is arranged in the base, and a top end of the lifting mechanism is fixedly connected with a table top. A plurality of drying mechanisms are arranged on the table top, and top ends of the drying mechanisms are fixedly connected with a take-up mechanism. The take-up mechanism is connected with a powder collecting mechanism, the take-up mechanism is fixedly connected with the box body, and the take-up mechanism is connected to a wire collecting mechanism. The wire collecting mechanism is connected to the powder collecting mechanism, and the wire collecting mechanism is fixedly connected to the vacuumizing pipeline.

Preferably, the lifting mechanism includes lifting cylinders fixedly installed in the base, and an elastic support is are fixedly connected to an output shaft of the each of lifting cylinders. An annular groove is formed around the base, an annular wall is slidably connected in the annular groove, the annular wall is fixedly connected with a bottom end of the table top, and the elastic support is fixedly connected to the bottom end of the table top.

Preferably, each of the drying mechanisms includes a communicating vessel fixedly connected with the table top. The communicating vessel includes a horizontal communicating tube fixedly connected with the table top. Two ends of the horizontal communicating tube are communicated with vertical sliding tubes, and sealing blocks are slidably connected in the two vertical sliding tubes. The sealing blocks are fixedly connected with first upright posts, where top ends of the first upright posts are fixedly connected with a material container, and one side of each of the first upright posts is meshed with a gear through teeth. Support rods are fixedly connected with the table top, and each of the support rods is rotatably connected with the gear, and a side of the gear away from each of the first upright posts is engaged with teeth of a second upright post. Each of the support rods is fixedly connected with a limit ring, and the limit ring is sleeved outside each of the first upright posts and corresponding the second upright post. The second upright post is fixedly connected with a heating element, and the material container is fixedly connected between the two first upright posts. A center of the table top is fixedly connected with heat insulation boards. The heat insulation boards evenly separate several heating elements, and top ends of the heat insulation boards are fixedly installed with the take-up mechanism.

Preferably, the take-up mechanism includes a fixed table fixed at the top ends of the heat insulation boards, and a take-up assembly is detachably connected to the fixed table, and the take-up assembly is wound with a door opening wire. The top end of the box body is fixedly provided with a reversing wheel, where a door opening wire penetrates the reversing wheel, and the door opening wire is connected with the wire collecting mechanism.

Preferably, the wire collecting mechanism includes a main body fixedly connected with a top of the vacuumizing pipeline, a side of the main body is provided with an outlet hole, a bottom of the main body is fixedly provided with a plurality of branch tubes, and the branch tubes are internally provided with several pull ropes penetrated in the main body, and the pull ropes extend out of the outlet hole and are fixedly connected with the door opening wire.

Preferably, the powder collecting mechanism includes a mounting base fixedly connected to the top of the vacuumizing pipeline, and a plurality of evenly distributed electrostatic sheets are fixedly connected to a bottom of the mounting base. The electrostatic sheets are slidably connected with a friction block, and the friction block is rotatably connected with a first connecting rod. One end of the first connecting rod away from the friction block is rotatably connected with a second connecting rod, and the second connecting rod is provided with a strip hole. One end of the second connecting rod away from the first connecting rod is rotatably connected with a fixed rod, and the fixed rod is fixedly connected with the mounting base, and the fixed rod is fixedly connected with a third connecting rod. One end of the third connecting rod away from the fixed rod is rotatably connected with a rotating shaft through a bearing. One side of the rotating shaft is fixedly connected with a fourth connecting rod, and one end of the fourth connecting rod away from the rotating shaft is penetrated in the strip hole, and an other side of the rotating shaft is fixedly connected with a fan blade. Two ends of the mounting base are fixedly connected with mounting plates, and two sides of each of the mounting plates are rotatably connected with a plurality of sealing plates, and the sealing plates are respectively fixedly connected with the pull ropes. The plurality of sealing plates are fixedly connected with springs, and one end of each of the springs away from each of the sealing plates is fixedly connected with the vacuumizing pipeline, and a collecting pipe is communicated below the vacuumizing pipeline, and the collecting pipe is located below the electrostatic sheets.

A using method of the vacuum drying device includes following steps:

- S1, uniformly stirring and placing a material to be vacuum dried;
- S2, sampling and calculating moisture contents of the material;
- S3, estimating a total water content put into a vacuum drying device through the moisture contents;
- S4, measuring a displacement required to open the powder collecting mechanism;
- S5, calculating stiffness coefficients of the elastic supports used by the drying mechanisms through the total water content and the displacement;
- S6, providing the elastic supports matched to the drying mechanisms according to the stiffness coefficients;
- S7, placing the materials to be dried on the drying mechanisms, and controlling distances between the material and heating devices through the communicating vessel to make the materials evenly heated, and vacuumizing the material at the same time;
- S8, collecting powders by the powder collecting mechanism after the material is dried to obtain a dried material; and
- S9, recovering the dried material and the powders.

Preferably, the step S2 comprising, sampling an upper layer, a middle layer and a bottom layer of the material respectively to obtain an upper layer sample, a middle layer sample and a bottom layer sample, mixing the upper layer sample, the middle layer sample and the bottom layer sample to obtain a mixed sample, and weighing the mixed sample to obtain a wet weight, and then drying the mixed sample to obtain a dry weight after drying, and finally calculating the moisture contents of the dry weight.

Compared with the prior art, the disclosure has following advantages and technical effects.

Evenly distributed materials are respectively put into the drying mechanisms, and the drying mechanisms dry the materials. The lifting mechanism on the base is used to drive the drying mechanisms to move up and down, and there is a pumping force in the vacuumizing pipeline. The take-up mechanism and the wire collecting mechanism may ensure the powder collecting mechanism to perform further powder collection, and may avoid condensation water gathering when an air humidity is high, which affects a drying effect. There is no need to add additional sensors and controllers, thus reducing a cost and improving stability.

With gradual drying of material moisture, a drying degree of each of the materials in each material container is different, so a weight of each material container may be different. When weights of material containers change, according to a principle of the communicating vessel, the more a material moisture of one of the materials in one of the material containers is lost, the more the weight is reduced, so that a total weight of the one of the material containers and the one of the materials may become lighter, so the first upright posts and the sealing blocks at bottoms are driven to ascend. When the first upright posts ascend, the gears drive the second upright posts to descend. Because the heating elements are fixed on upper parts of the second upright posts, distances between the heating elements and the material containers may automatically expand, thus reducing a drying temperature.

When a material in one of the material containers is heavier than other materials due to slow moisture dissipation, the one of the material containers of the material with more moisture descends according to the principle of the communicating vessel. The first upright posts descend during descending, and the first upright posts drive the second upright posts to ascend through the gears, so a distance between one of the material containers of the material with more moisture and the heating elements is shortened. The distances between the materials and the heating elements may be automatically adjusted according to the water contents of the materials, so that the drying degree of each of the materials is more uniform in a drying process, thereby improving a drying efficiency.

By arranging the elastic supports, the door opening wire and the pull ropes, the sealing door is in a closed state when humidity in the vacuumizing pipeline is high, so that a situation that wet air is condensed on the electrostatic sheets to form water backflow which affects a drying effect may be avoided.

The friction block may not only make the electrostatic sheets charged with static electricity, but also scrape off the moisture and powders collected on the electrostatic sheets. The scraped powders and moisture may fall into the collecting pipe, so the powders entering the vacuumizing pipe may be automatically collected.

BRIEF DESCRIPTION OF THE DRAWINGS

Attached drawings constituting a part of this application are used to provide a further understanding of this application. Illustrative embodiments of this application and their descriptions are used to explain this application, and do not constitute an improper limitation of this application. The attached drawings are as follows.

DETAILED DESCRIPTION OF THE EMBODIMENTS

Figure 1:
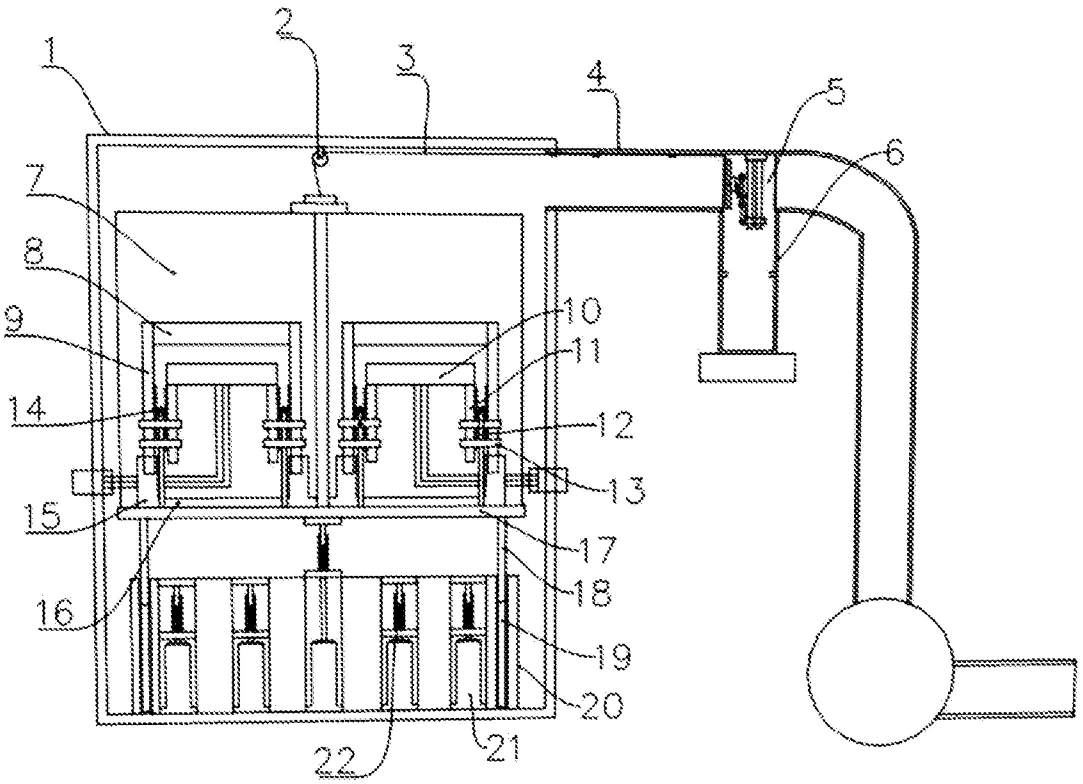
FIG. 1 is a schematic structural diagram of a vacuum drying device according to the disclosure.
Figure 2:
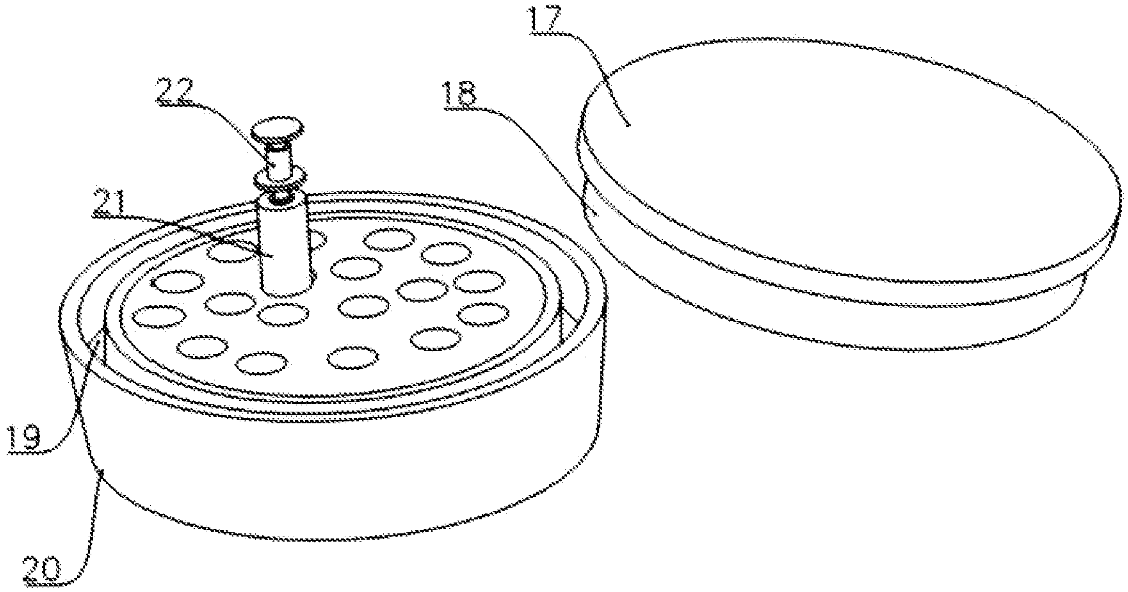
FIG. 2 is a schematic view of a base of a vacuum drying device according to the disclosure.
Figure 3:
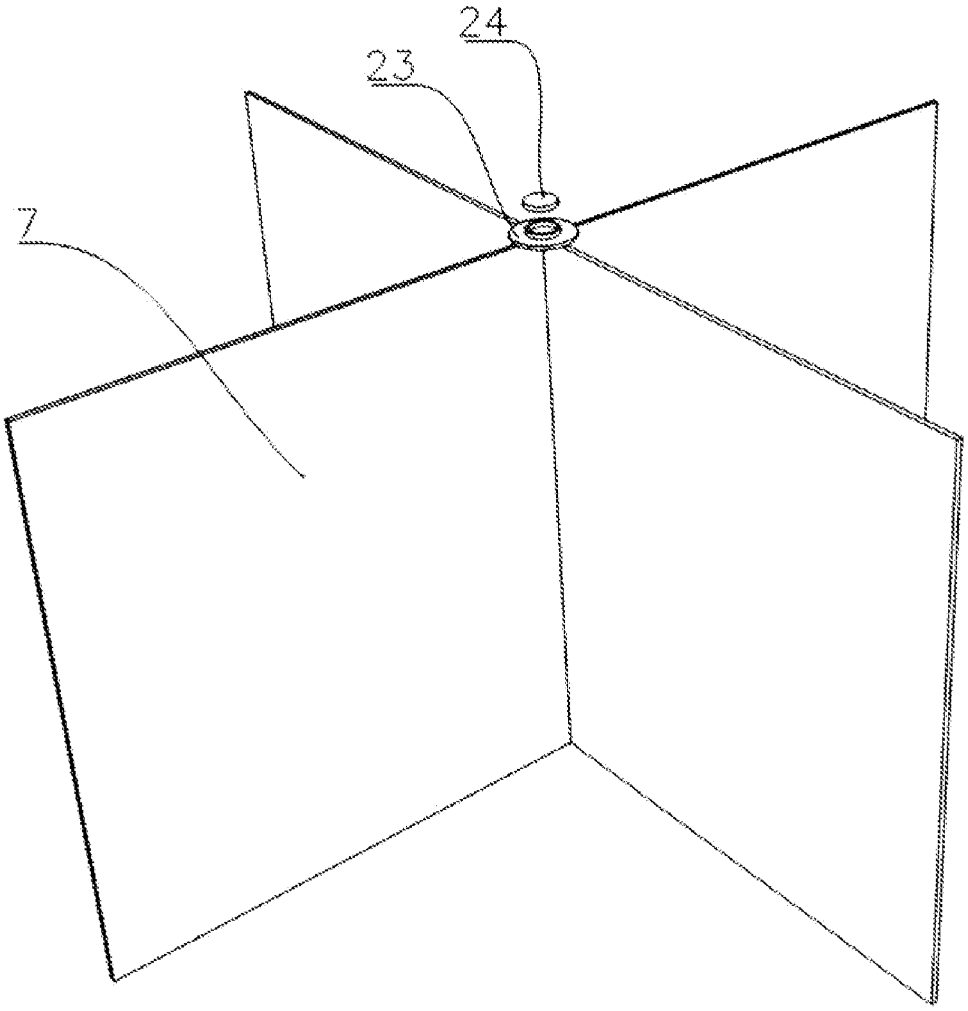
FIG. 3 is a schematic view of heat insulation boards of a vacuum drying device according to the disclosure.
Figure 4:
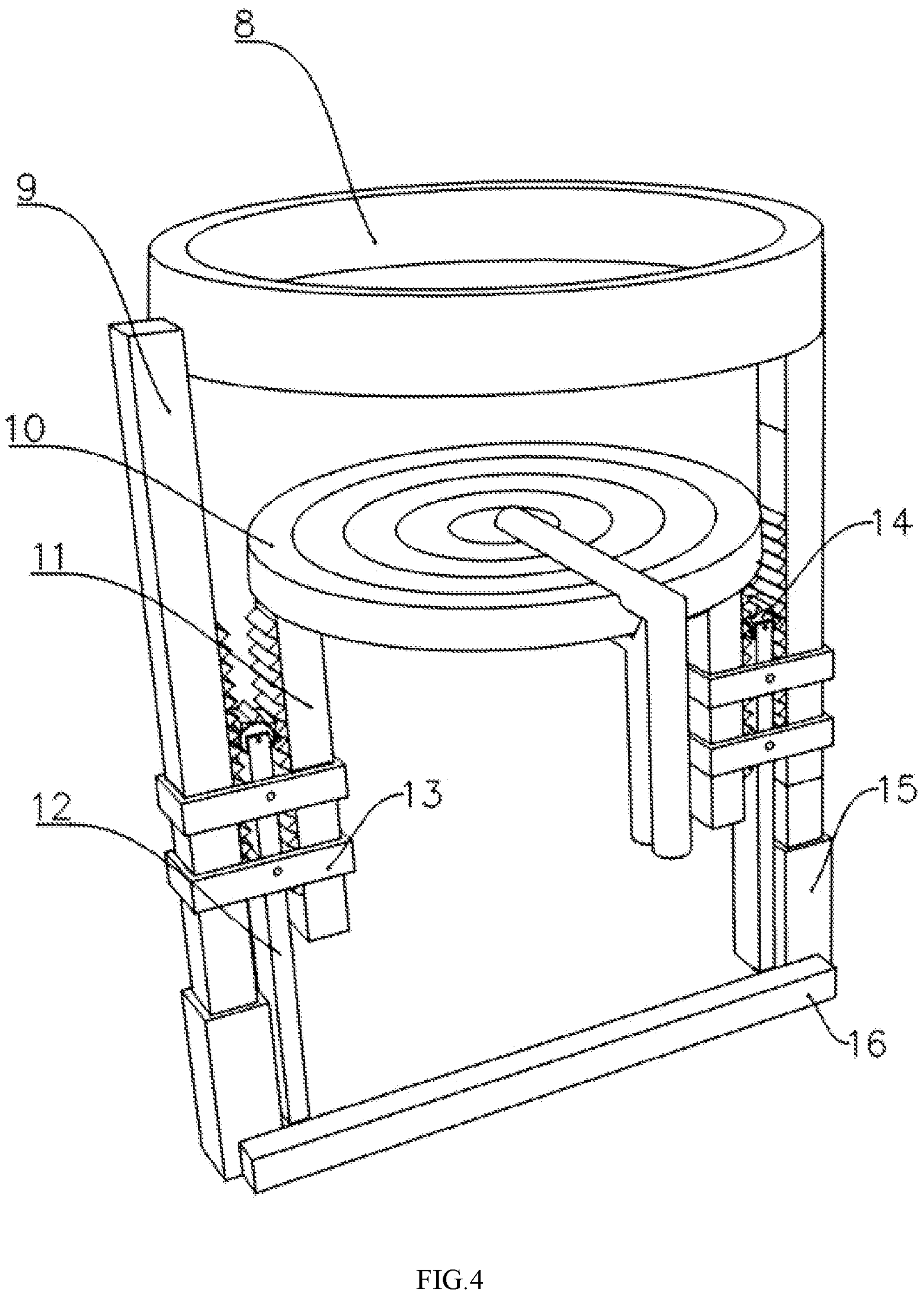
FIG. 4 is a schematic diagram of a drying mechanism according to the disclosure.
Figure 5:
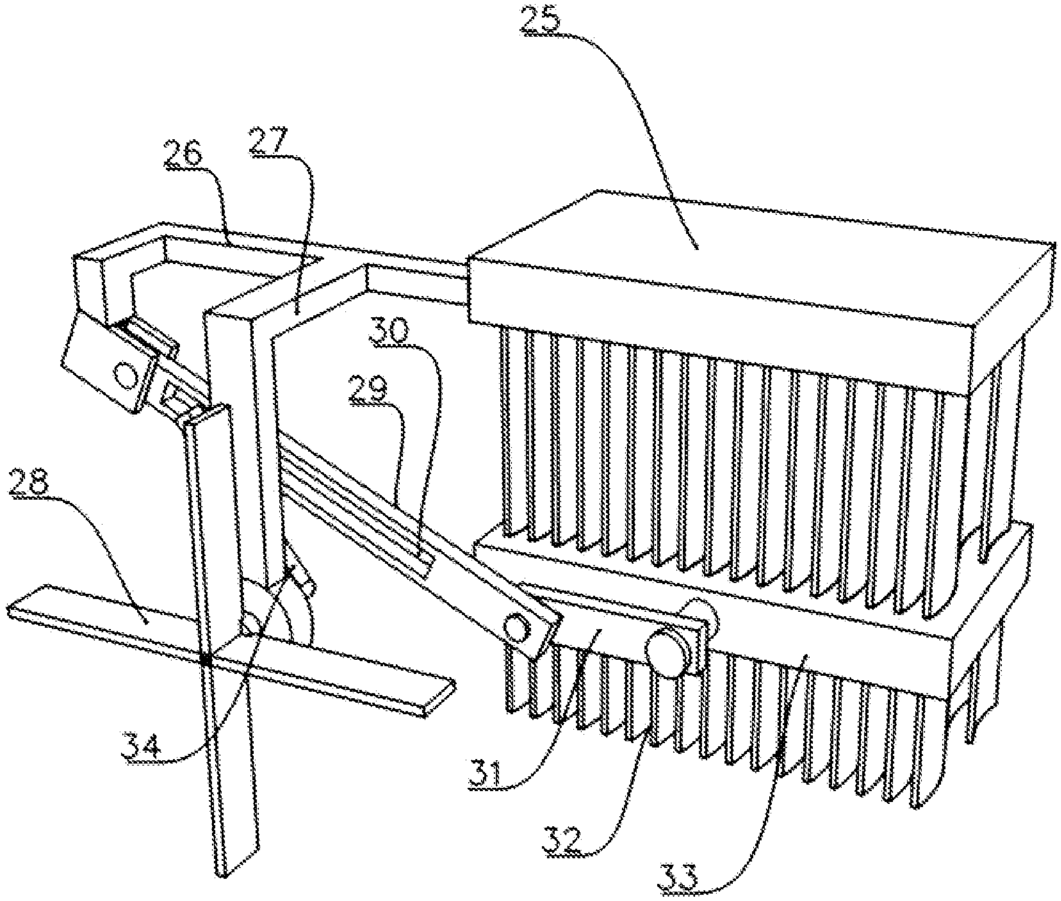
FIG. 5 is a schematic diagram of a powder collecting mechanism according to the disclosure.
Figure 6:
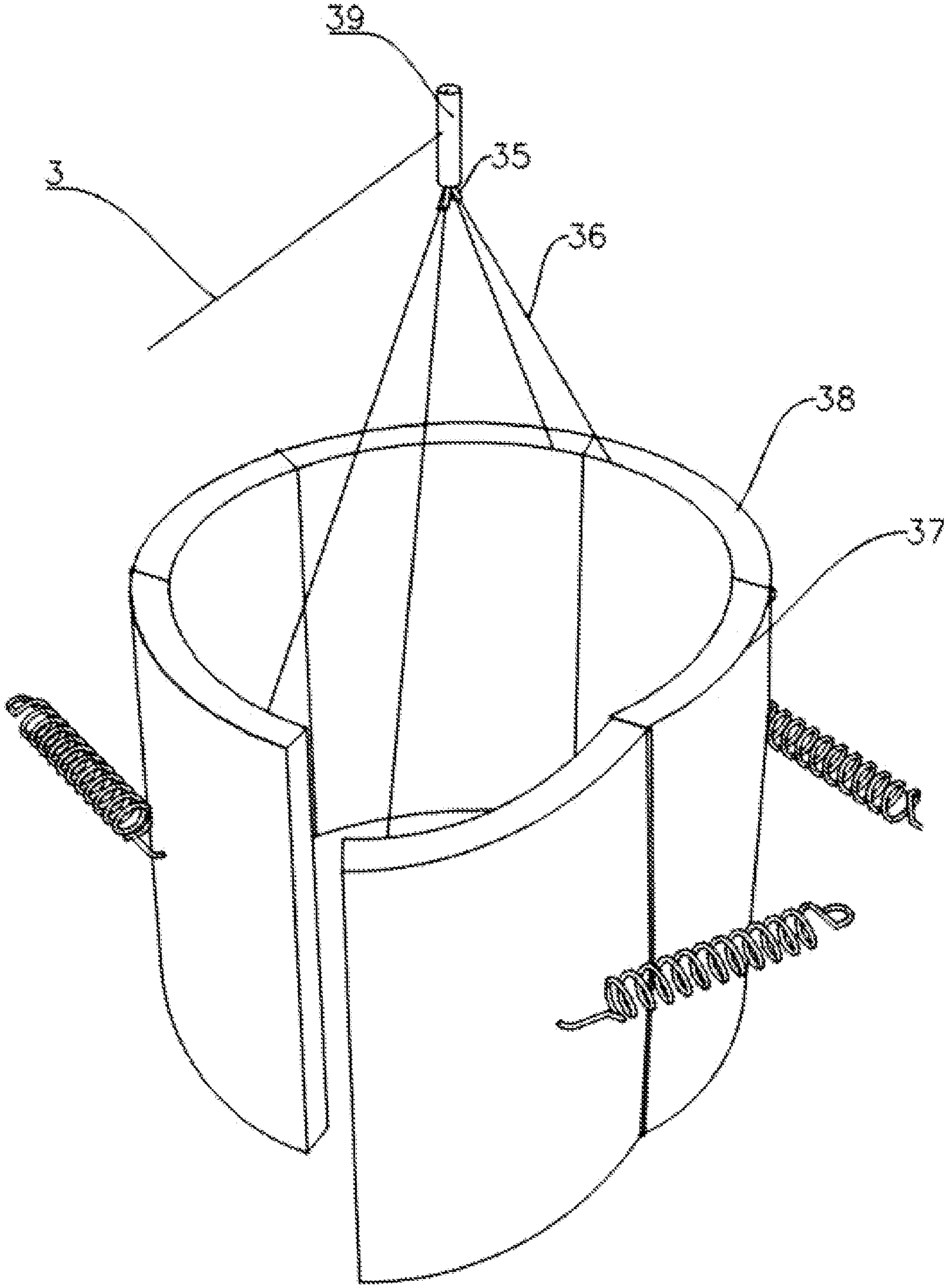
FIG. 6 is a schematic diagram of a wire collecting mechanism according to the disclosure.

In the following, technical schemes in embodiments of the disclosure may be clearly and completely described with reference to attached drawings. Obviously, the described embodiments are only a part of the embodiments of the disclosure, but not all embodiments. Based on the embodiments in the disclosure, all other embodiments obtained by ordinary technicians in the field without a creative labor belong to a scope of protection of the disclosure.

In order to make above objects, features and advantages of the disclosure more obvious and easier to understand, the disclosure may be further described in detail with the attached drawings and specific embodiments.

With reference to FIGS. 1-6, the disclosure provides a vacuum drying device, including a box body 1, where a bottom end of the box body 1 is provided with a base 20, and a top end of the box body 1 is communicated with a vacuumizing pipeline 4. A lifting mechanism is arranged in the base 20, and a top end of the lifting mechanism is fixedly connected with a table top 17. A plurality of drying mechanisms are arranged on the table top 17, and top ends of the drying mechanisms are fixedly connected with a take-up mechanism. The take-up mechanism is connected with a powder collecting mechanism 5, the take-up mechanism is fixedly connected with the box body 1, and the take-up mechanism is connected to a wire collecting mechanism. The wire collecting mechanism is connected to the powder collecting mechanism 5, and the wire collecting mechanism is fixedly connected to the vacuumizing pipeline 4.

Evenly distributed materials are respectively put into the drying mechanisms, and the drying mechanisms dry the materials. The lifting mechanism on the base 20 is used to drive the drying mechanisms to move up and down, and there is a pumping force in the vacuumizing pipeline 4. The take-up mechanism and the wire collecting mechanism may ensure the powder collecting mechanism 5 to perform further powder collection, and may avoid condensation water gathering when an air humidity is high, which affects a drying effect. There is no need to add additional sensors and controllers, thus reducing a cost and improving stability.

According to a further optimization scheme, the lifting mechanism includes lifting cylinders 21 fixedly installed in the base 20, and an elastic support 22 is fixedly connected to an output shaft of each of the lifting cylinders 21. An annular groove 19 is formed around the base 20, an annular wall 18 is slidably connected in the annular groove 19, the annular wall 18 is fixedly connected with a bottom end of the table top 17, and the elastic support 22 is fixedly connected to the bottom end of the table top 17. The base 20 is provided with the annular groove 19, and stiffness coefficients of the elastic supports 22 are different. A bottom of the table top 17 is fixed with the annular wall 18 adapted to the annular groove 19. When the annular wall 18 extends into the annular groove 19, the annular wall 18 and the base 20 form a sealed cavity, and the elastic supports 22 are in the sealed cavity. Bottoms of the elastic supports 22 are flush with a surface of the table top 17 when the output shafts of the lifting cylinders 21 are fully extended.

Further, the elastic supports 22 may be gas springs or spring struts.

According to a further optimization scheme, each of the drying mechanisms includes a communicating vessel fixedly connected with the table top 17. The communicating vessel includes a horizontal communicating tube 16 fixedly connected with the table top 17. Two ends of the horizontal communicating tube 16 are communicated with vertical sliding tubes 15, and sealing blocks are slidably connected in the two vertical sliding tubes 15. The sealing blocks are fixedly connected with first upright posts 9, where top ends of the first upright posts 9 are fixedly connected with a material container 8, and one side of each of the first upright posts 9 is meshed with a gear 14 through teeth. Support rods 12 are fixedly connected with the table top 17, and each of the support rods 12 is rotatably connected with the gear 14, and a side of the gear 14 away from each of the first upright posts 9 is engaged with teeth of a second upright post 11. Each of the support rods 12 is fixedly connected with a limit ring 13, and the limit ring 13 is sleeved outside each of the first upright posts 9 and corresponding the second upright post 11. The second upright post 11 is fixedly connected with a heating element 10, and the material container 8 is fixedly connected between two the first upright posts 9. A center of the table top 17 is fixedly connected with heat insulation boards 7. The heat insulation boards 7 evenly separates several heating elements 10, and top ends of the heat insulation boards 7 are fixedly installed with the take-up mechanism.

A liquid in the communicating vessel is hydraulic oil, and tops of the vertical sliding tubes 15 are also provided with sealing elements, and the first upright posts 9 pass through the sealing elements. All the vertical sliding tubes 15 are communicated through horizontal communicating tubes 16, so when a weight of each material container 8 is different, heights of material containers 8 with different weights are different due to a communicating effect of communicating vessels. The communicating vessel is provided with the liquid. The vertical sliding tubes 15 are slidably connected with the sealing blocks, and the material container 8 is supported on the sealing blocks through the first upright posts 9. One side of each of the first upright posts 9 is meshed with the gear 14 through the teeth, the gear 14 is rotatably connected with each of the support rods 12 through a manifold lug, and the support rods 12 are fixedly connected with the table top 17. An other side of the gear 14 is meshed with the teeth of the second upright post 11, the limit ring 13 is fixed on each of the support rods 12, and the limit ring 13 is adapted to each of the first upright posts 9 and the second upright post 11. The heating element 10 is fixed on the second upright post 11, and a detachable take-up mechanism is fixed on the table top 17. The lifting cylinders 21 and the heating element 10 are both conventional products in a market, where the heating element 10 may be a ventilation coil, a liquid-passing coil or a heating coil, and a size of the heating element 10 is adapted to the material container 8 located above.

Further, the communicating vessel has two or more containers communicating with each other below a liquid level. Liquid levels of communicating vessels filled with a same liquid and with a same pressure on the liquid level have equal heights.

According to a further optimization scheme, the take-up mechanism includes a fixed table 23 fixed at the top ends of the heat insulation boards 7, and a take-up assembly 24 is detachably connected to the fixed table 23, and the take-up assembly 24 is wound with a door opening wire 3. The top end of the box body 1 is fixedly provided with a reversing wheel 2, where a door opening wire 3 penetrates the reversing wheel 2, and the door opening wire 3 is connected with the wire collecting mechanism. The fixed table 23 is one of a magnetic attraction table, a hook table and a clamping table. A fixing piece adapted to the fixed table 23 is fixed on the take-up assembly 24, and a take-up rotating shaft capable of automatically taking up the wire and a positioning piece for fixing a wire body at any length are arranged in the take-up assembly 24. The take-up assembly 24 is wound with the door opening wire 3 for controlling the powder collecting mechanism 5 to open or close the door. A principle of the take-up assembly 24 is similar to that of a tape measure commonly used in the market. A threading ring is also fixed at a top of the vacuumizing pipeline 4, and a reversing wheel 2 is installed inside the box body 1, and the door opening wire 3 bypasses the reversing wheel 2 and is fixedly connected with the take-up rotating shaft inside the take-up assembly 24.

According to a further optimization scheme, the wire collecting mechanism includes a main body 39 fixedly connected with the top of the vacuumizing pipeline 4, a side of the main body 39 is provided with an outlet hole, a bottom of the main body 39 is fixedly provided with a plurality of branch tubes 35, and the branch tubes 35 are internally provided with several pull ropes 36 penetrated in the main body 39, and the pull ropes 36 extend out of the outlet hole and are fixedly connected with the door opening wire 3. Under a control of the pull ropes 36 and the door opening wire 3, when the door opening wire 3 and the pull ropes 36 are tightened, a sealing door is closed under a pulling force of the pull ropes 36, and sealing plates 38 and mounting plates 37 are enclosed into a closed ring in a circumferential direction.

Further, the branch tubes 35 and the main body 39 are internally provided with elastic wear-resistant layers, and the wire collecting mechanism is used for reducing wear.

According to a further optimization scheme, the powder collecting mechanism 5 includes a mounting base 25 fixedly connected to a top of the vacuumizing pipeline 4, and a plurality of evenly distributed electrostatic sheets 32 are fixedly connected to a bottom of the mounting base 25. The electrostatic sheets 32 are slidably connected with a friction block 33, and the friction block 33 is rotatably connected with a first connecting rod 31. One end of the first connecting rod 31 away from the friction block 33 is rotatably connected with a second connecting rod 29, and the second connecting rod 29 is provided with a strip hole 30. One end of the second connecting rod 29 away from the first connecting rod 31 is rotatably connected with a fixed rod 26, and the fixed rod 26 is fixedly connected with the mounting base 25, and the fixed rod 26 is fixedly connected with a third connecting rod 27. One end of the third connecting rod 27 away from the fixed rod 26 is rotatably connected with a rotating shaft through a bearing. One side of the rotating shaft is fixedly connected with a fourth connecting rod 34, and one end of the fourth connecting rod 34 away from the rotating shaft is penetrated in the strip hole 30, and an other side of the rotating shaft is fixedly connected with a fan blade 28. Two ends of the mounting base 25 are fixedly connected with the mounting plates 37, and two sides of each of the mounting plates 37 are rotatably connected with a plurality of sealing plates 38, and the sealing plates 38 are respectively fixedly connected with the pull ropes 36. The plurality of sealing plates 38 are fixedly connected with springs 40, and one end of each of the springs 40 away from each of the sealing plates 38 is fixedly connected with the vacuumizing pipeline 4, and a collecting pipe 6 is communicated below the vacuumizing pipeline 4, and the collecting pipe 6 is located below the electrostatic sheets 32.

The powder collecting mechanism 5 includes the mounting base 25 fixed on the top of the vacuumizing pipeline 4, and the electrostatic sheets 32 arranged at even intervals are mounted on the mounting base 25. The electrostatic sheets 32 are slidably connected with the friction block 33, and the friction block 33 is rotatably connected with the first connecting rod 31 through a fixing pin, and the end of the first connecting rod 31 is rotatably connected with the second connecting rod 29 through a fixing pin. A middle of the second connecting rod 29 is provided with the strip hole 30, and the end of the second connecting rod 29 is rotatably connected to the fixed rod 26 through a manifold lug. strip hole 30 is formed in a middle of the second connecting rod 29. The end of the second connecting rod 29 is rotatably connected with the fixed rod 26 through the manifold lug, and the fixed rod 26 is fixedly connected with the mounting base 25. The fixed rod 26 is rotatably connected with the rotating shaft through the third connecting rod 27 and the bearing. One end of the rotating shaft is fixed with the fan blade 28, and the other end is fixed with the fourth connecting rod 34, and a pin shaft of the fourth connecting rod 34 penetrates into the strip hole 30. When the fan blade 28 rotates, the friction block 33 is driven to reciprocate on the electrostatic sheets 32. The mounting plates 37 are fixed on both sides of the mounting base 25, and the two sides of each of the mounting plate 37 are rotatably connected with the sealing plates 38 through hinges. In order to further prevent wet air from condensing on the electrostatic sheets 32, a top plate and a bottom plate may be installed at tops and bottoms of the sealing plates 38, so that tops and bottoms of the electrostatic sheets 32 are also closed when the sealing plates 38 and the mounting plates 37 are enclosed. The mounting plates 37 and the sealing plates 38 are continuously arranged around the mounting base 25 and the electrostatic sheets 32. The springs 40 are installed between the sealing plates 38 and a side wall of the vacuumizing pipeline 4, and the tops of the sealing plates 38 are fixedly connected with the pull ropes 36, and all the pull ropes 36 are fixedly connected with the door opening wire 3. The vacuumizing pipeline 4 is also provided with a collecting port. The collecting pipe 6 is installed at the collecting port, and the collecting port is located directly below the electrostatic sheets 32.

Figure 7:
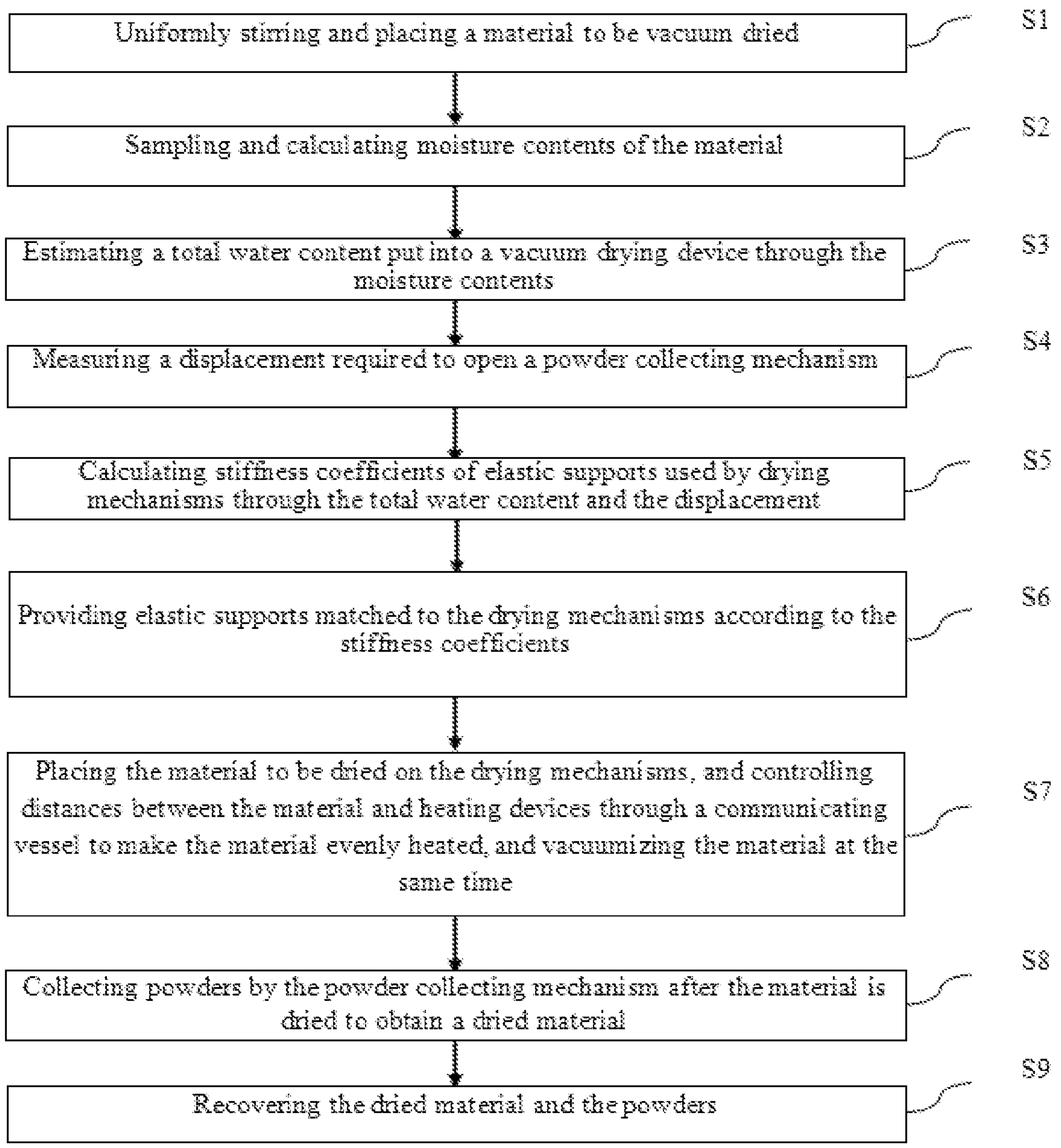
FIG. 7 is a flowchart of a using method of a vacuum drying device according to the disclosure.

As shown in FIG. 7, a using method of the vacuum drying device includes following steps.

- S1, a material to be vacuum dried is uniformly stirred and placed.
- S2, moisture contents of the material are sampled and calculated.
- S3, a total water content put into a vacuum drying device is estimated through the moisture contents.
- S4, a displacement required to open the powder collecting mechanism 5 is measured.
- S5, stiffness coefficients of the elastic supports used by the drying mechanisms are calculated through the total water content and the displacement.
- S6, the elastic supports matched to the drying mechanisms are provided according to the stiffness coefficients.
- S7, the materials to be dried are placed on the drying mechanisms, and distances between the material and heating devices are controlled through the communicated vessel to make the materials evenly heated, and the material is vacuumized at the same time.
- S8, powders are collected by the powder collecting mechanism 5 after the material is dried to obtain dried material.
- S9, the dried material and the powders are recovered.

Because a displacement length required to control opening and closing of the sealing door by the door opening wire 3 and the pull ropes 36 is fixed, and the moisture contents of the materials are known, the total water content of the materials in the box body 1 may be calculated, and a weight change before and after drying and the required displacement may be known, so that the stiffness coefficients of the required elastic supports 22 may be calculated.

According to a further optimization scheme, in the step S2, an upper layer, a middle layer and a bottom layer of each of the materials are sampled respectively, and samples are mixed, and a mixed sample is weighed to obtain a wet weight, and then the mixed sample is dried after weighing to obtain a dry weight after drying, and finally each of the moisture contents is calculated.

WORKING PRINCIPLE

When a material needs to be dried, the material is first stirred evenly to make a moisture content of the material uniform. Then, the material is sampled after stirring evenly. During a sampling process, an upper layer, a middle layer and a bottom layer of the material are sampled respectively, and a total weight of a mixed sample measured after sampling is a wet weight. Then, the sample is dried, and a dry weight is obtained after thorough drying, and then a moisture content may be calculated by substituting a moisture content calculation method.

Then, the material is evenly distributed. Evenly distributed materials are put into the material containers 8 respectively. Because weights of the materials are the same, the sealing blocks at bottoms of the first upright posts 9 slide in the vertical sliding tubes 15, and there are hydraulic oil in the vertical sliding tubes 15 and the horizontal communicating tubes 16, when the weights of the materials are even, a liquid level of each of the vertical sliding tubes 15 receives a same gravity. Therefore, according to a principle of the communicating vessel, if the communicating vessels contain a same liquid, but pressures on liquid levels are different, a pressure difference of the liquid levels is equal to a pressure difference generated by a height difference of the liquid levels between two containers of the communicating vessels, and the material containers 8 remain parallel.

Because the displacement length required to control the opening and closing of the sealing door is fixed through the door opening wire 3 and the pull ropes 36, and moisture contents of the materials are known, a total water content of the materials in the box body 1 may be calculated. A weight change before and after drying and the required displacement are known, so that stiffness coefficients of the required elastic supports 22 may be calculated. The lifting cylinders 21 are controlled to lift elastic supports 22 with corresponding stiffness coefficients. The sealing door is controlled to be closed through the door opening wire 3 and the pull ropes 36, and then the take-up device 24 is fixed on the fixed table 23 by bypassing the reversing wheel 2. Meanwhile, the door opening wire 3 is fixed through the positioning piece of the take-up device 24. The heating elements 10 are started to heat the materials, and a vacuum generator is started at the same time, and the vacuum generator vacuumizes an interior of the box body 1 through the vacuumizing pipeline 4. The moisture of the materials is pumped out of the box body 1 after evaporation by heat. With gradual drying of the moisture of the materials, a drying degree of each of the materials in each material container 8 may vary, so a weight of each material container 8 may be different. When weights of the material containers 8 change, according to the principle of the communicating vessel, the more moisture of one of the materials in one of the material containers 8 is lost, the more the weight is reduced, so that a total weight of the one of the material containers 8 and the one of the materials may become lighter, so the first upright posts 9 and the sealing blocks at the bottoms are driven to ascend. When the first upright posts 9 ascend, the gears 14 drive the second upright posts 11 to descend. Because the heating elements 10 are fixed on upper parts of the second upright posts 11, distances between the heating elements 10 and the material containers 8 may automatically expand, thus reducing a drying temperature. When a material in one of the material containers 8 is heavier than other materials due to slow moisture dissipation, the one of the material containers 8 of the material with more moisture descends according to the principle of the communicating vessel. The first upright posts 9 descend during descending, and the first upright posts 9 drive the second upright posts 11 to ascend through the gears 14, so a distance between one of the material containers 8 of the material with more moisture and the heating elements 10 is shortened. The distances between the materials and the heating elements 10 may be automatically adjusted according to the water contents of the materials, so that the drying degree of each of the materials is more uniform in a drying process, thereby improving a drying efficiency. Moreover, an adjustment may be automatically performed without installing a water quantity detection device and a control device, so that stability of the vacuum drying device may be significantly improved, and a cost is the same as that of an ordinary vacuum drying device.

In a process of moisture loss of the materials, total weights of the table top 17 and the drying mechanism are decreasing, and the reduced weights are weights of the moisture loss, so the table top 17 gradually rises under an elastic force of the elastic supports 22. When the moisture of the materials is basically dried, the table top 17 rises to a highest position. Because the stiffness coefficients of the elastic supports 22 are adapted to the displacement of the door opening wire 3 required for opening the sealing door, when the materials are basically dried, the sealing door is close to walls of the vacuumizing pipeline 4 under an elastic force of the springs. On the one hand, two sides are sealed by the sealing door, causing air in the vacuumizing pipeline 4 to gather to a middle, so that the air in the vacuumizing pipeline 4 basically passes through the electrostatic sheets 32. On the other hand, the electrostatic sheets 32 are in an open state to collect dust from the passing air. Due to a suction force in the vacuumizing pipeline 4, the fan blade 28 is driven to rotate when an airflow passes through the fan blade 28, and rotation of the fan blade 28 drives the fourth connecting rod 34 to rotate. Rotation of the fourth connecting rod 34 drives the second connecting rod 29 to swing back and forth around the manifold lug, and the end of the first connecting rod 31 swings up and down during reciprocating swing of the second connecting rod 29, so the fan blade 28 does not need to rotate in a whole circle. Since the fan blade 28 is located inside the vacuumizing pipeline 4, two blades in a vertical state on the fan blade 28 come into contact with the airflow at the same time. The airflow blows a blade located above to displace, so that the blade 28 may rotate forward and drive the fourth connecting rod 34 to rotate, and the fourth connecting rod 34 drives the second connecting rod 29 to swing. When a forward rotation of the fan blade 28 causes one end of the second connecting rod 29 to interfere with the fixed rod 26 and may not rotate, the airflow may blow a blade located below to move, so that the fan blade 28 rotates in an opposite direction and drives the fourth connecting rod 34 to rotate, and the fourth connecting rod 34 drives the second connecting rod 29 to swing, thereby achieving a purpose of the reciprocating swing of the second connecting rod 29.

The first connecting rod 31 drives the friction block 33 to move up and down on the electrostatic sheets 32. The friction block 33 may not only make the electrostatic sheets 32 charged with static electricity, but also scrape off the moisture and the powders collected on the electrostatic sheets 32. The scraped powders and moisture may fall into the collecting pipe 6, so the powders entering the vacuumizing pipe 4 are collected. Moreover, condensation water accumulation affecting a drying effect may be avoided when an air humidity is high. There is no need to add additional sensors as well as controllers, thus reducing costs and improving stability.

In the description of the disclosure, it should be understood that terms "vertical", "horizontal", "up", "down", "front", "back", "left", "right", "vertical", "horizontal", "top", "bottom", "inside", "outside", and other indications of orientation or positional relationships are based on orientation or positional relationships shown in the attached drawings, solely for a convenience of describing the disclosure, rather than indicating or implying that a device or a component referred to must have a specific orientation, be constructed and operated in a specific orientation, therefore it may not be understood as a limitation of the disclosure.

The above-mentioned embodiments only describe preferred modes of the disclosure, and do not limit a scope of the disclosure. Under a premise of not departing from a design spirit of the disclosure, various modifications and improvements made by ordinary technicians in the field to the technical schemes of the disclosure shall fall within the scope of protection determined by claims of the disclosure.

What is claimed is:

1. A vacuum drying device, comprising a box body, wherein a bottom end of the box body is provided with a base, and a top end of the box body is communicated with a vacuumizing pipeline; a lifting mechanism is arranged in the base, and a top end of the lifting mechanism is fixedly connected with a table top; a plurality of drying mechanisms are arranged on the table top, and top ends of the drying mechanisms are fixedly connected with a take-up mechanism; the take-up mechanism is connected with a powder collecting mechanism, the take-up mechanism is fixedly connected with the box body, and the take-up mechanism is connected to a wire collecting mechanism; the wire collecting mechanism is connected to the powder collecting mechanism, and the wire collecting mechanism is fixedly connected to the vacuumizing pipeline.

2. The vacuum drying device according to claim 1, wherein the lifting mechanism comprises lifting cylinders fixedly installed in the base, and an elastic support is fixedly connected to an output shaft of each of the lifting cylinders; an annular groove is formed around the base, an annular wall is slidably connected in the annular groove, the annular wall is fixedly connected with a bottom end of the table top, and the elastic support is fixedly connected to the bottom end of the table top.

3. The vacuum drying device according to claim 1, wherein each of the drying mechanisms comprises a communicating vessel fixedly connected with the table top; the communicating vessel comprises a horizontal communicating tube fixedly connected with the table top; one end of the horizontal communicating tube are communicated with vertical sliding tubes, and sealing blocks are slidably connected in two the vertical sliding tubes; the sealing blocks are fixedly connected with first upright posts, wherein top ends of the first upright posts are fixedly connected with a material container, and one side of each of the first upright posts is meshed with a gear through teeth; support rods are fixedly connected with the table top, and each of the support rods is rotatably connected with the gear, and a side of each of the gears away from each of the first upright posts is engaged with a second upright post through teeth; each of the support rods is fixedly connected with a limit ring, and the limit ring is sleeved outside each of the first upright posts and corresponding the second upright post; the second upright post is fixedly connected with a heating element, and the material container is fixedly connected between two the first upright posts; a center of the table top is fixedly connected with heat insulation boards; the heat insulation boards evenly separates several heating elements, and top ends of the heat insulation boards are fixedly installed with the take-up mechanism.

4. The vacuum drying device according to claim 3, wherein the take-up mechanism comprises a fixed table fixed at the top ends of the heat insulation boards, and a take-up assembly is detachably connected to the fixed table, and the take-up assembly is wound with a door opening wire; the top end of the box body is fixedly provided with a reversing wheel, wherein a door opening wire penetrates the reversing wheel, and the door opening wire is connected with the wire collecting mechanism.

5. The vacuum drying device according to claim 4, wherein the wire collecting mechanism comprises a main body fixedly connected with a top of the vacuumizing pipeline, a side of the main body is provided with an outlet hole, a bottom of the main body is fixedly provided with a plurality of branch tubes, and the branch tubes are internally provided with several pull ropes penetrated in the main body, and the pull ropes extend out of the outlet hole and are fixedly connected with the door opening wire.

6. The vacuum drying device according to claim 5, wherein the powder collecting mechanism comprises a mounting base fixedly connected to the top of the vacuumizing pipeline, and a plurality of evenly distributed electrostatic sheets are fixedly connected to a bottom of the mounting base; the electrostatic sheets are slidably connected with a friction block, and the friction block is rotatably connected with a first connecting rod; one end of the first connecting rod away from the friction block is rotatably connected with a second connecting rod, and the second connecting rod is provided with a strip hole; one end of the second connecting rod away from the first connecting rod is rotatably connected with a fixed rod, and the fixed rod is fixedly connected with the mounting base, and the fixed rod is fixedly connected with a third connecting rod; one end of the third connecting rod away from the fixed rod is rotatably connected with a rotating shaft through a bearing; one side of the rotating shaft is fixedly connected with a fourth connecting rod, and one end of the fourth connecting rod away from the rotating shaft is penetrated in the strip hole, and an other side of the rotating shaft is fixedly connected with a fan blade; two ends of the mounting base are fixedly connected with mounting plates, and two sides of each of the mounting plates are rotatably connected with a plurality of sealing plates, and the sealing plates are respectively fixedly connected with the pull ropes; the plurality of sealing plates are fixedly connected with springs, and one end of each of the springs away from each of the sealing plates is fixedly connected with the vacuumizing pipeline, and a collecting pipe is communicated below the vacuumizing pipeline, and the collecting pipe is located below the electrostatic sheets.

7. A using method of the vacuum drying device, based on the vacuum drying device according to claim 1, comprising following steps:

S1, uniformly stirring and placing a material to be vacuum dried;

S2, sampling and calculating moisture contents of the material;

S3, estimating a total water content put into the vacuum drying device through the moisture contents;

S4, measuring a displacement required to open the powder collecting mechanism;

S5, calculating stiffness coefficients of the elastic supports used by the drying mechanisms through the total water content and the displacement;

S6, providing the elastic supports matched to the drying mechanisms according to the stiffness coefficients;

S7, placing the material to be dried on the drying mechanisms, and controlling distances between the materials and heating devices through the communicating vessel to make the material evenly heated, and vacuumizing the material at the same time;

S8, collecting powders by the powder collecting mechanism after the material is dried to obtain a dried material; and S9, recovering the dried material and the powders.

8. The using method of the vacuum drying device according to claim 7, wherein the step S2 comprises: sampling an upper layer, a middle layer and a bottom layer of the material respectively to obtain an upper layer sample, a middle layer sample and a bottom layer sample; mixing the upper layer sample, the middle layer sample and the bottom layer sample to obtain a mixed sample; weighing the mixed sample to obtain a wet weight, and then drying the mixed sample to obtain a dry weight after drying; and finally calculating the moisture contents of the dry weight.

* * * * *